United States Patent [19]

Ito et al.

[11] Patent Number: 4,589,532

[45] Date of Patent: May 20, 1986

[54] SPEED SELECTION MEANS FOR VEHICLE TRANSMISSION SYSTEM PROVIDING EITHER MANUAL OR FULLY AUTOMATIC OPERATION

[75] Inventors: Hiroshi Ito; Shigemichi Yamada, both of Toyota, Japan

[73] Assignee: Toyota Jidosha Kabushiki Kaisha, Toyota, Japan

[21] Appl. No.: 473,217

[22] Filed: Mar. 8, 1983

[30] Foreign Application Priority Data

Apr. 23, 1982 [JP] Japan ............................ 57-68407

[51] Int. Cl.$^4$ .............................................. B60K 41/22
[52] U.S. Cl. .................... 192/0.03; 192/3.57; 192/3.62
[58] Field of Search ............... 192/0.03, 0.052, 0.073, 192/0.075, 0.076, 0.092, 3.58, 48.8, 48.9, 48.1, 3.57, 3.61, 3.62; 74/330, 333, 334, 336 R, 359, 336.5

[56] References Cited

U.S. PATENT DOCUMENTS

| | | | |
|---|---|---|---|
| 3,039,321 | 6/1962 | Weymann | 192/3.58 X |
| 3,078,673 | 2/1963 | Browning et al. | 74/330 |
| 3,204,730 | 9/1965 | Alfieri et al. | 192/3.58 X |
| 3,348,643 | 10/1967 | Townsend | 192/3.58 |
| 3,684,071 | 8/1972 | Wheymann | 192/3.58 |
| 3,691,861 | 9/1972 | Sturmer | 74/330 |
| 4,140,031 | 2/1979 | Sibello | 74/336 R |
| 4,366,889 | 1/1983 | Wang | 192/3.58 |
| 4,373,619 | 2/1983 | Schritt et al. | 74/866 |
| 4,463,621 | 8/1984 | Fisher | 74/330 |

Primary Examiner—George H. Krizmanich
Attorney, Agent, or Firm—Oblon, Fisher, Spivak, McClelland & Maier

[57] ABSTRACT

In a vehicle transmission system providing either manual or fully automatic operation according to selective switching-over of an operational mode selection means, a speed selection means for operation by a vehicle driver to select a range of speed stages available according to automatic speed change control by the transmission system in automatic operation thereof is also used in manual operation thereof as a means to set the transmission system to any forward speed stage desired by the vehicle driver in such a manner that its shifting to D, 3, 2 and L positions provide fourth, third, second and first speed stages, respectively.

2 Claims, 3 Drawing Figures

SPEED SELECTION MEANS FOR VEHICLE TRANSMISSION SYSTEM PROVIDING EITHER MANUAL OR TULLY AUTOMATIC OPERATION

BACKGROUND OF THE INVENTION

The present invention relates to a transmission for an automotive vehicle, and more particularly relates to a transmission for an automotive vehicle which can be operated selectively either in a manual speed stage selection mode with the use of a clutch pedal, or in a fully automatic mode without any clutch pedal operation, the selection between these two operational modes being decided by the vehicle operator.

A transmission for use in an automotive vehicle such as a passenger car generally can be operated in a plurality of different speed stages, in each of which a particular gearing ratio is available between the rotational power output member of the engine of the vehicle and the driving wheels; and two sorts of such transmission are per se well known: a manual transmission incorporating a clutch, and a full automatic transmission.

In the case of a per se well known manual type transmission, a clutch device is provided in the power train between the rotational power output member of the engine of the vehicle and the transmission, and this clutch device is selectively drivable (by the foot, usually) of the operator of the vehicle pressing on a clutch driving member such as a clutch pedal. In this case, also the particular currently desired one of the speed stages of the transmission mechanism is manually selected by the operator, by pushing a speed stage selection member such as a gear lever, or by some similar procedure. Thus, by coordinating the operation of the clutch driving member, the accelerator pedal or other load determining member of the engine, and the speed stage selection member of the transmission, the operator of the vehicle can cause it to move away from rest in the first or the reverse speed stage, and can shift between the various vehicle speed stages of the transmission during vehicle motion, according entirely to his or her own personal wish and desire, as prompted by judgement based upon skill in vehicle operation. Such a transmission is reasonably convenient and pleasant to use for a skilled driver, and provides the maximum possible flexibility in transmission operation and control, but the delicacy of coordinated control required for operating the clutch pedal, the gear lever, and the accelerator pedal in unison is not possessed by all vehicle operators, and furthermore even for a skilled vehicle operator over a long period of driving time such coordinated control can become very tiring, particularly in city traffic conditions.

Another per se well known type of vehicle transmission is a fully automatic type in which the vehicle incorporates no such clutch driving member such as a clutch pedal. In such a transmission system, the slippage required to be present in the vehicle drive train when the vehicle is being started off from rest and when the speed stages of the transmission are being shifted between is either made available by the incorporation of a fluid torque converter of a per se well known sort or by the incorporation of an automatically operated clutch device between the engine and the transmission, and the various speed stages of the transmission are automatically selected and automatically engaged by a transmission control device, again of a per se well known sort, which receives information regarding various operational parameters of the vehicle (such as vehicle road speed and engine load), and which based upon this information and upon predetermined transmission shifting patterns dispatches control signals to the transmission. Such a transmission is very easy to use, and has advantages with regard to not becoming tiring to operate even over a long period of vehicle driving in heavy traffic, and has the advantageous feature that the operator of the vehicle is not distracted from paying attention to road conditions by the requirements of transmission operation, and furthermore can be operated by a driver who is not skilled in the rather delicate art of simultaneous clutch and transmission and accelerator operation discussed above, but since the transmission speed stages are selected automatically by the transmission control device the control of the vehicle operator over which transmission stage is engaged is necessarily limited, and thus the speed stage which is actually desired to be engaged by the vehicle operator may not currently be engaged. Further, since no clutch pedal system is incorporated in such a fully automatic type transmission system, certain types of vehicle operation involving delicate clutch manipulation may be unavailable.

SUMMARY OF THE INVENTION

The present inventor has conceived of the idea that, since both the manual type of transmission and also the full automatic type of transmission both have their advantages and disadvantages, which are essentially complementary, it would be beneficial to provide a transmission which could be operated either in a manual mode or in a fully automatic mode.

Accordingly, it is the primary object of the present invention to provide a transmission mechanism which can be operated either as a manual type transmission system or as a fully automatic type transmission system.

It is another object of the present invention to provide such a transmission mechanism in which the switchover bewteen the manual operational mode and the fully automatic operational mode is simply performed.

It is another object of the present invention to provide a transmission mechanism with which, even when it is operated by a relatively unskilled vehicle operator over a long period of driving time, control does not become tiring.

It is another object of the present invention to provide a transmission mechanism which may be operated in such a mode that such operation does not become tiring to the vehicle operator even in city traffic conditions.

It is another object of the present invention to provide a transmission mechanism which in one of its operational modes can be operated so that the currently most appropriate one of the speed stages of the transmission mechanism is automatically selected and automatically engaged by a transmission control device which receives information regarding various operational parameters of the vehicle such as vehicle road speed and engine load and which based upon this information and upon predetermined transmission shifting patterns dispatches control signals to the transmission.

It is another object of the present invention to provide a transmission mechanism which is very easy to use.

It is another object of the present invention to provide a transmission mechanism with the use of which the operator of the vehicle is not distracted from paying attention to road conditions by the requirements of transmission operation.

It is another object of the present invention to provide a transmission mechanism which in one of its operational modes can be operated by a driver who is not skilled in the rather delicate art of simultaneous clutch and transmission and accelerator operation discussed above.

It is another object of the present invention to provide a transmission mechanism which in one of its operational modes can be operated to move the vehicle away from rest by the use of a driver operated type clutch pedal, as coordinated with the use of an accelerator pedal and a gear selection lever.

It is another object of the present invention to provide a transmission mechanism which in one of its operational modes can be operated to shift between speed stages by the use of a driver operated type clutch pedal.

It is another object of the present invention to provide a transmission mechanism which in one of its operational modes can be operated to select the particular currently desired one of the speed stages of the transmission mechanism manually by the operator pushing a speed stage selection member such as a gear lever.

It is another object of the present invention to provide a transmission mechanism which in one of its operational modes can be operated so that the operator can shift between the various speed stages of the transmission, during vehicle motion, according entirely to his or her own personal wish and desire.

It is another object of the present invention to provide a transmission mechanism which in one of its operational modes can shifted by the operator between its various speed stages as prompted by his or her own judgement based upon skill in vehicle operation.

It is another object of the present invention to provide a transmission mechanism which is convenient and pleasant to use for a skilled driver.

It is another object of the present invention to provide a transmission mechanism which provides the maximum possible flexibility in transmission operation and control.

It is another object of the present invention to provide a transmission mechanism with which the control of the vehicle operator over which transmission stage is engaged is not substantially limited, so that any speed stage which is actually desired to be engaged by the vehicle operator may be currently engaged.

According to the most general aspect of the present invention, these and other objects are accomplished by a transmission for an automotive vehicle comprising an engine, comprising: (a) a clutching mechanism which receives rotational power from said engine and which is selectively controllable to be engaged or disengaged so as to transmit rotational power or not; (b) a gear transmission mechanism which receives rotational power from said clutching mechanism and which is selectively controllable to provide any one of a plurality of speed stages; (c) a clutch pedal which is operated by a foot of a driver of the vehicle; (d) means for the vehicle driver to set the desired transmission operational mode to either automatic or manual operational mode; (e) means for selectively operatively connecting said clutch pedal to said clutching mechanism; said clutching pedal, when so engaged to said clutching mechanism, disengaging it when and only when depressed; (f) means for the vehicle driver to set the desired transmission speed stage to any one of said plurality of speed stages when said means for setting the desired transmission operational mode is set to the manual operational mode; and (g) means for controlling said transmission, which according to the current desired transmission operational mode currently set by the vehicle driver on said means for setting desired transmission operational mode functions either in an automatic mode or a manual mode: which, in said automatic mode, controls said means for selectively operatively connecting said clutch pedal to said clutching mechanism so as to operatively disconnect said clutch pedal from said clutching mechanism, and according to operational parameters of the vehicle itself controls said clutching mechanism and also controls said gear transmission mechanism so as to provide a currently appropriate speed stage and a currently appropriate clutching mechanism engagement condition for the current values of said operational parameters; and which, in said manual mode, controls said means for selectively operatively connecting said clutch pedal to said clutching mechanism so as to operatively connect said clutch pedal to said clutching mechanism, not controlling said clutching mechanism itself, and according to the currently desired speed stage currently set by the vehicle driver on said means for setting the desired transmission speed stage controls said gear transmission mechanism so as to provide said driver set currently desired speed stage.

According to such a structure, therefore, a transmission system is provided which can be operated either as a manual type transmission system or as a fully automatic type transmission system. When the means for setting transmission operational mode is set to the automatic mode, then the transmission control means will disconnect the clutch pedal from the clutching mechanism, so that its operation is irrelevant, and instead controls the clutching mechanism itself, along with also controlling the gear transmission mechanism, so as to provide the current most desirable speed stage of the transmission, based upon judgements which it makes itself; and thus the operation of the transmission is fully automatic. On the other hand, when the means for setting transmission operational mode is set to the manual mode, then the transmission control means will connect the clutch pedal to the clutching mechanism so as to control it, abandoning its own control of said clutching mechanism, and now will control the gear transmission mechanism so as to provide the speed stage selected by the vehicle driver on the transmission speed stage setting means, i.e. not based upon judgements which it makes itself but instead based on only the sovereign judgement of the driver; and thus the operation of the transmission is fully manual.

Thus the complementary advantages of both the manual type of transmission and also the full automatic type of transmission are combined, and their disadvantages may be avoided. In other words, in the full automatic operational mode, even when the transmission system is operated by a relatively unskilled vehicle operator over a long period of driving time, control does not become tiring, even in city traffic conditions. Accordingly, the vehicle incorporating this transmission system is in this operational mode very easy to use, and during driving the operator of the vehicle is not distracted from paying attention to road conditions by the requirements of transmission operation. Further, the vehicle can be operated by a driver who is not skilled at simultaneously operating the clutch and transmission and accelerator pedal. On the other hand, when the transmission system is being operated in its manual operational mode, the vehicle may be moved away from rest by the coordinated use of the clutch pedal and the accelerator pedal and the gear selection means. Further, the clutch pedal can be used to shift between the speed stages by the operator, along with manual operation of the gear selection means, exactly as with an ordinary form of manual transmission. Thus, in this operational mode, the operator can shift between the various speed stages of the transmission, during vehicle motion, according entirely to his or her own personal wish and desire and judgement based upon skill in vehicle operation. This makes the transmission and the vehicle as a whole convenient and pleasant to use for a skilled driver, in the manual operational mode, and provides the maximum possible flexibility in transmission operation and control, by not substantially limiting the control of the vehicle operator over which transmission stage is engaged, so that any speed stage which is actually desired to be engaged may be engaged.

Further, according to a particular structural specialization of the present invention, these and other objects are accomplished by a transmission of the sort described above, wherein said means for the vehicle driver to set the desired transmission speed stage to any one of said plurality of speed stages when said means for setting the desired transmission operational mode is set to the manual operational mode also, when said means for setting the desired transmission operational mode is set to the automatic operational mode, is used by the driver for setting the desired transmission operating range to any one of a plurality of ranges of transmission speed stages; and wherein, when thus said means for setting the desired transmission operational mode is set to the automatic operational mode, said means for controlling said transmission controls said gear transmission mechanism and said clutching mechanism according to operational parameters of the vehicle so as to provide a currently appropriate speed stage within said thus driver set desired transmission operating range for the current values of said operational parameters.

According to such a structure, this means for setting transmission speed stage during the manual operational mode is also conveniently used for setting transmission range during the fully automatic operational mode; this is done according to some preferably logically arranged predetermined plan of correspondence between transmission speed stages and ranges, as for example the correspondence in which: the fourth speed stage corresponds to the "D" or drive range in which any of the first through the fourth speed stages may be engaged; the third speed stage corresponds to the "3" or third range in which any of the first through the third speed stages may be engaged; the second speed stage corresponds to the "2" or second range in which either the first speed stage or the second speed stage may be engaged; the first speed stage corresponds to the "L" or low range in which only the first speed stage may be engaged; the reverse speed stage corresponds to the "R" or reverse range in which only the reverse speed stage may be engaged; and the neutral speed stage corresponds to both the "N" or neutral range and the "P" or parking range. This duality of functions is economical of parts and of control functions from the driver's point of view, and accordingly is most advantageous.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings, like parts and features are denoted by like reference symbols in the various figures thereof, and:

DESCRIPTION OF THE PREFERRED EMBODIMENT

Figure 1:
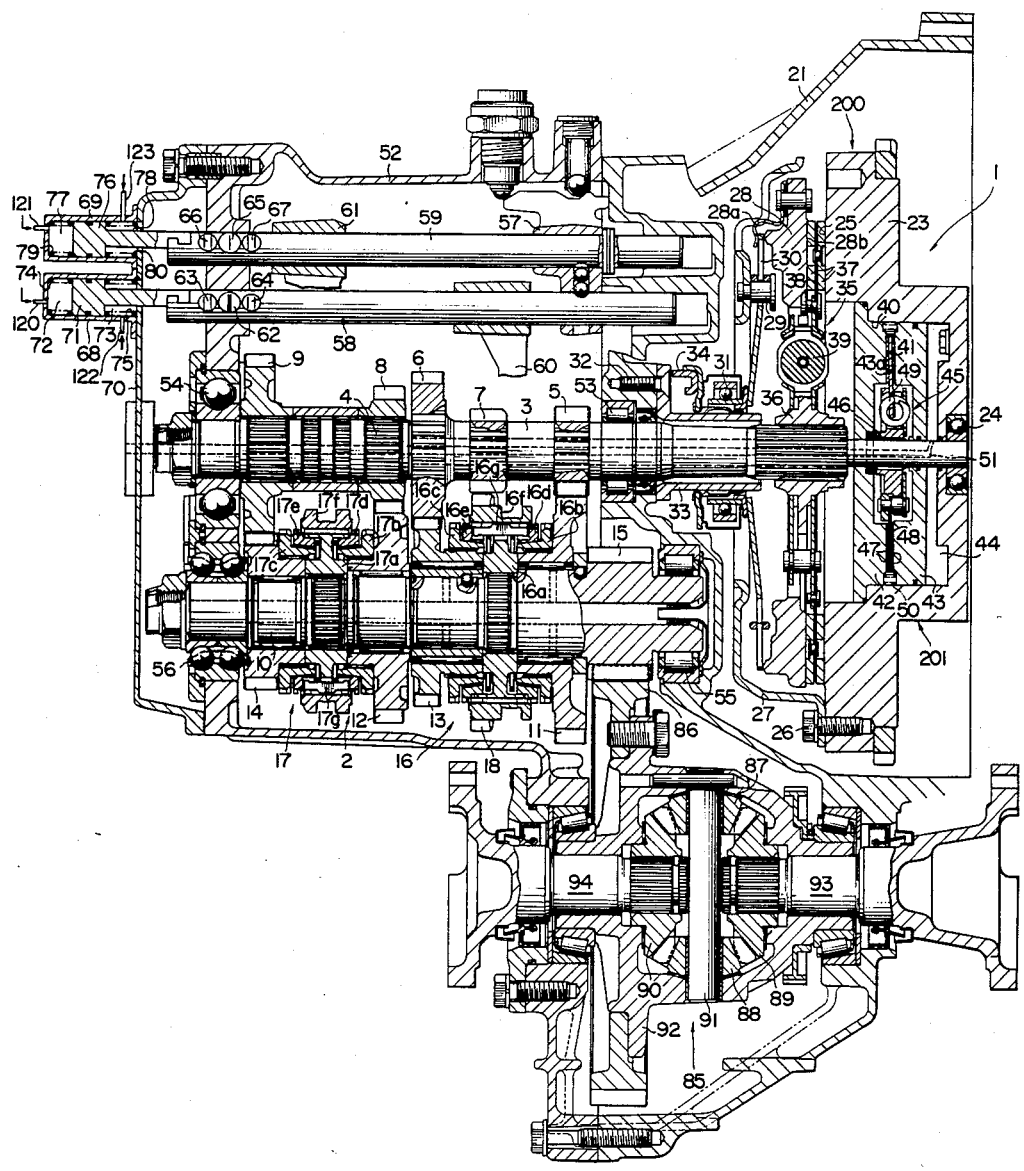
FIG. 1 is a detailed longitudinal sectional constructional view of a transmission mechanism incorporated in the preferred embodiment of the transmission system according to the present invention, this particular transmission in fact incorporating two power transmission systems and two clutch mechanisms.

The present invention will now be described with reference to the preferred embodiment thereof, and with reference to the appended drawings. FIG. 1 shows a transmission mechanism incorporating two power transmission systems and two clutch mechanisms in a detailed longitudinal cross sectional view. In this figure, the reference numeral 1 generally denotes a multiple clutching mechanism, and 2 generally denotes a gear transmission mechanism.

A first hollow driving gear wheel shaft 3 is rotatably mounted in the transmission casing 52 via a bearing 53, extending horizontally across the upper portion of the casing 52 in the figure, ("left", "right", "up", and "down" will be used in the sense of the relevant figure hereinafter), and a second substantially solid driving gear wheel shaft 4 is coaxially rotatably mounted within and extending through the tubular space inside the first hollow driving gear wheel shaft 3 on bearings which are not shown in the figure, with the left and right ends of the second driving gear wheel shaft 4 each protruding out from the left and right ends of said first driving gear wheel shaft 3 for a certain distance, the left end of said second solid driving gear wheel shaft 4 being rotatably supported from the transmission casing 52 by another bearing 54. In parallel with the coaxial first and second driving gear wheel shafts 3 and 4 and displaced downwards therefrom there is provided a driven gear wheel shaft 10, which is rotatably supported from the transmission casing 52 by bearings 55 and 56.

On the driven gear wheel shaft 10 there are rotatably mounted, in order from the right to the left in FIG. 1, a first speed driven gear wheel 11, a third speed driven gear wheel 13, a second speed driven gear wheel 12, and a fourth speed driven gear wheel 14. On the first driving gear wheel shaft 3 there are fixedly mounted, in order from the right to the left in FIG. 1, a first speed driving gear wheel 5, a reverse speed driving gear wheel 7, and a third speed driving gear wheel 6. On the portion of the second driving gear wheel shaft 4 which projects outwards to the left from the left hand end of the first driving gear wheel shaft 3 there are fixedly mounted, in order from the right to the left in FIG. 1, a second speed driving gear wheel 8 and a fourth speed driving gear wheel 9. The first speed driving gear wheel 5 is in constant mesh with the first speed driven gear wheel 11; the second speed driving gear wheel 8 is in constant mesh with the second speed driven gear wheel 12; the third speed driving gear wheel 6 is in constant mesh with the third speed driven gear wheel 13; and the fourth speed driving gear wheel 9 is in constant mesh with the fourth speed driven gear wheel 14.

Between the first speed driven gear wheel 11 and the third speed driven gear wheel 13 on the driven gear wheel shaft 10 there is fitted a first-third synchronizer 16, which performs the function of synchronizing engagement of the first speed stage and of the third speed stage, as will be understood hereinafter. The first-third synchronizer 16 is of a per se well known sort, in fact being an inertia lock type Borg Warner synchromesh device. The first-third synchronizer 16 comprises a hub 16a which is fixedly mounted on the driven gear wheel shaft 10, a first speed cone member 16b and synchronizer ring 16d associated with the first speed driven gear wheel 11 and a third speed cone member 16c and synchronizer ring 16e associated with the third speed driven gear wheel 13, and a first-third synchronizer sleeve 16f and locking key 16g. The function of this first-third synchronizer 16 is to rotationally couple either the first speed driven gear wheel 11 or the third speed driven gear wheel 13 or neither of them to the driven gear wheel shaft 10, according respectively as the first-third synchronizer sleeve 16f is slid to the right, to the left, or is allowed to remain at its intermediate position. On the outside of the first-third synchronizer sleeve 16f there is formed a reverse speed driven gear wheel 18, the action of which will be explained later, which is substantially coplanar with the reverse speed driving gear wheel 7 on the first driving gear wheel shaft 3.

Between the second speed driven gear wheel 12 and the fourth speed driven gear wheel 14 on the driven gear wheel shaft 10 there is fitted a second-fourth synchronizer 17, which performs the function of synchronizing engagement of the second speed stage and of the fourth speed stage, as will be understood hereinafter. This second-fourth synchronizer 17 is also of a per se well known sort, in fact also being an inertia lock type Borg Warner synchromesh device. The second-fourth synchronizer 17 comprises a hub 17a which is fixedly mounted on the driven gear wheel shaft 10, a second speed cone member 17b and synchronizer ring 17d associated with the second speed driven gear wheel 12 and a fourth speed cone member 17c and synchronizer ring 17e associated with the fourth speed driven gear wheel 14, and a second-fourth synchronizer sleeve 17f and locking key 17g. The function of this second-fourth synchronizer 17 is to rotationally couple either the second speed driven gear wheel 12 or the fourth speed driven gear wheel 14 or neither of them to the driven gear wheel shaft 10, respectively according as the second-fourth synchronizer sleeve 17f is slid to the right, to the left, or is allowed to remain at its intermediate position.

On the right hand end portion of the driven gear wheel shaft 10 there is also fixedly mounted a power output gear wheel 15, which is in constant mesh with a differential power input ring gear 86 of a differential gear mechanism 85, which is of a per se well known sort. The differential gear mechanism 85 comprises a bevel gear wheel case 92 to which said power input ring gear 86 is fixed so as to rotate said bevel gear wheel case 92, and perpendicular to the rotational axis of the bevel gear wheel case 92 there is fixed a bevel gear wheel shaft 91, on which there are rotatably mounted a pair of bevel gear wheels 87 and 88. Also supported rotatably by the casing of the differential gear mechanism 85 as coaxial with the rotational axis of the bevel gear wheel case 92 there are provided left and right power output shafts 93 and 94, to the inner ends of which there are fixed bevel gear wheels 89 and 90, respectively. These bevel gear wheels 89 and 90 are each in constant mesh with both of the bevel gear wheels 87 and 88. The operation of such a differential mechanism as this differential gear mechanism 85 is per se well known.

Figure 2:
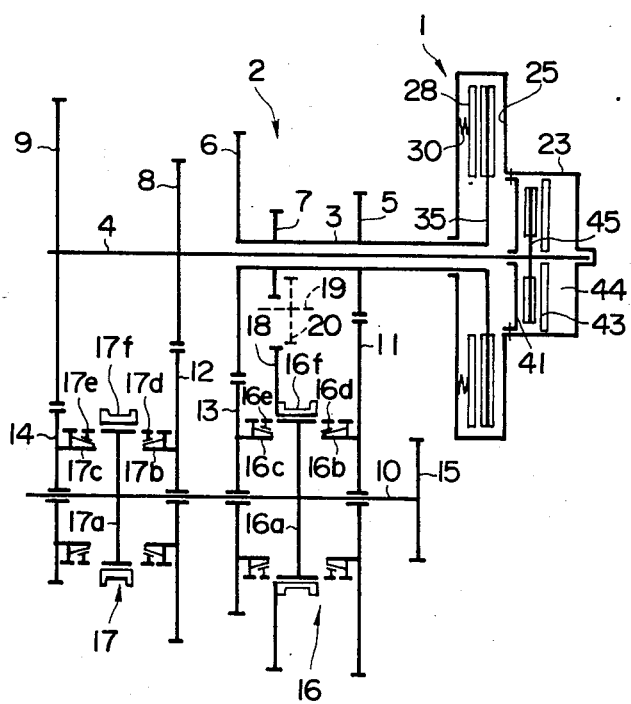
FIG. 2 is a schematic skeleton structural view of the transmission mechanism, incorporated in the preferred embodiment of the present invention, showing in FIG. 1.

Finally, on a reverse idler gear wheel shaft 19 which is supported as parallel to the first and second driving gear wheel shafts 1 and 2 and the driven gear wheel shaft 10 there is rotatably and slidably mounted a reverse idler gear wheel 20. Neither the reverse idler gear wheel shaft 19 nor the reverse idler gear wheel 20 can be seen in FIG. 1 because they are hidden by other members, but they are schematically shown in FIG. 2. Arrangements which will be described in detail hereinafter are provided for shifting this reverse idler gear wheel 20 to and fro in the left and right directions on the reverse idler gear wheel shaft 19; and, when the reverse idler gear wheel 20 is in its most rightwards position on the reverse idler gear wheel shaft 19, said reverse idler gear wheel 20 does not mesh with any other gear wheels and is therefore free to rotate; but, when the reverse idler gear wheel 20 is in its most leftwards position on the reverse idler gear wheel shaft 19, said reverse idler gear wheel 20 meshes with the reverse speed driving gear wheel 7 and with the reverse speed driven gear wheel 18 formed on the outside of the first-third synchronizer sleeve 16f, so as to provide a reverse speed stage, as will be explained later.

The multiple clutching mechanism 1 is provided within a clutch housing 21, and its power input member 23 is in fact that flywheel of an internal combustion engine not shown in the figure which is used to power the vehicle to which this transmission is fitted. The rotational axis of the power output member of this internal combustion engine is of course coincident with the rotational axis of the first and second driving gear wheel shafts 3 and 4. Between this engine flywheel 23 and the first hollow driving gear wheel shaft 3 there is provided a selectively engageable first clutch assembly 200, and between this engine flywheel 23 and the portion of the second solid driving gear wheel shaft 4 which protrudes from the right hand end of said hollow driving gear wheel shaft 3 there is provided a selectively engageable second clutch assembly 201. This right hand end of the protruding portion of the second solid driving gear wheel shaft 4 and the hub portion of the flywheel 23 are mutually supported by a bearing 24. Thus, according to selective engagement of the first and the second clutch assemblies 200 and 201, either the first driving gear wheel shaft 3 or the second driving gear wheel shaft 4 or neither of them can be powered from said internal combustion engine, so as to be rotated thereby.

The details of the construction of the first clutch assembly 200, which in fact is the one of the two clutch assemblies 200 and 201 which is required to transmit the greater torque and which accordingly is the one of the larger radius, are as follows.

The face of the flywheel 23 facing towards the transmission 2 is formed with a flat annular frictional engagement surface 25. A clutch cover 27 is bolted to this right hand face of the flywheel 23 by means of a plurality of bolts 26, only one of which can be seen in FIG. 1. An annular pressure plate member 28 is fitted within the clutch cover 27 as movable along the axial line of the first driving gear wheel shaft 3, so as to oppose the frictional engagement surface 25. A plate or diaphragm spring 30 which is formed as an annulus is provided between the clutch cover 27 and the clutch plate member 28: in detail, a radially intermediate annular portion of the spring 30 is flexibly connected to the clutch cover 27 by a plurality of pin type fasteners 29, only one of which can be seen in FIG. 1 but which in fact are provided in a plurality as spaced around said radially intermediate annular portion, and the radially outer annular portion of the spring 30 is flexibly connected to the clutch plate member 28 by a plurality of spring type fasteners 28a, again only one of which can be seen in FIG. 1 but which in fact are again provided in a plurality as spaced around said radially outer annular portion.

A clutch disk assembly 35 is provided between the clutch plate member 28 and the opposing annular frictional engagement surface 25 of the flywheel 23. The clutch disk assembly 35 comprises a hub member 36 which is rotationally connected by splines to the first driving gear wheel shaft 3, an annular disk plate 38 which is sandwiched between the annular frictional engagement surface 25 of the flywheel 23 and the opposing annular pressure surface 28b of the clutch plate member 28, and a torsional or annular type shock absorber assembly 39 of a per se well known kind which connects the disk plate 38 and the hub member 36 with a certain amount of rotational resilience therebetween. Both the sides of the annular disk plate 38 are faced with high friction type clutch linings 37, so as to have a good frictional effect against the opposing frictional surfaces 28b and 25.

The radially inner portion of the plate spring 30 is formed as a tubular member which is axially drivingly connected with a clutch driving fork 34, via a clutch release bearing 31 which allows relative rotational movement but prevents relative axial motion therebetween and which is slidably mounted on a sleeve member 33 which is fitted over the first hollow driving gear wheel shaft 3 and which is fixed to the transmission casing 21 by a plurality of bolts 32 only one of which can be seen in FIG. 1. Only one of the clutch driving fork 34 can be seen in FIG. 1, but in fact this fork 34 is formed as a bar type member, an intermediate portion of which is pivoted to the transmission casing 52, and the other end of which is drivingly connected to the piston of a hydraulic actuator 95 which will be described later with reference to the schematic diagram of FIG. 3.

Thus, when the hydraulic fluid pressure chamber 96 of the hydraulic actuator 95 is not supplied with pressurized hydraulic fluid and thus does not drive said not shown other end of this clutch fork member 34, then the radially central portion of the plate spring 30 is not driven thereby in the rightwards direction in FIG. 1, and thus the spring action of the spring 30, by levering in a circular pivoting fashion around the pin type fasteners 29 according to the resilient action of the spring 30, causes its outer peripheral portion to be strongly impelled in the rightwards direction and to press, via the spring type fasteners 28a, the clutch pressure plate member 28 towards the opposing frictional engagement face 25 of the flywheel 23. In this operational mode, the annular disk plate 38 is tightly clamped between the opposing frictional surfaces 28b and 25 of the clutch plate member 28 and the flywheel 23 and is frictionally coupled thereto; and thereby the first driving gear wheel shaft 3 is rotationally powered from the internal combustion engine (not shown). On the other hand, when the hydraulic fluid pressure chamber 96 of the hydraulic actuator 95 is supplied with pressurized hydraulic fluid and thus drives the other end of this clutch fork member 34, then the radially central portion of the spring 30 is driven thereby in the rightwards direction in FIG. 1, and this overcomes the spring action of the spring 30 by levering this spring 30 in a circular pivoting fashion around the pin type fasteners 29, thus causing its outer peripheral portion to be moved in the leftwards direction and thus to cease to press the clutch pressure plate member 28 towards the opposing frictional engagement face 25 of the flywheel 23. In this operational mode, the annular disk plate 38 is not substantially squeezed between the respective opposing frictional surfaces 28b and 25 of the clutch plate member 28 and the flywheel 23, and accordingly is free to rotate with respect thereto; and thereby the first driving gear wheel shaft 3 is not substantially rotationally powered from the internal combustion engine.

The details of the construction of the second clutch assembly 201, which in fact is the one of the two clutch assemblies 200 and 201 which is required to transmit the lesser torque and which accordingly is the one of the smaller radius, are as follows.

The inner portion of the flywheel 23 is formed with a cylindrical cavity, facing towards the transmission 2, which has a cylindrical inner surface 40. This cavity is substantially pressure sealed in the rightwards direction in the figure by the cooperation of the second driving gear wheel shaft 4 and the radially inner portion of the flywheel 23, optionally with the interposition of a seal member therebetween. A clutch plate member 42 is fitted into the open left end of this cavity so as substantially to close it, and the inner or right hand surface of this clutch plate member 42 is formed as a flat annular frictional engagement surface 41. A piston member 43 is fitted within the cavity of the flywheel 23 as movable along the axial line of the second driving gear wheel shaft 4, and is slidably and rotatably and pressure sealingly engaged, optionally with the interposition of a seal member therebetween, over the end portion of said second driving gear wheel shaft 4, so that the left hand side of the piston member 43 opposes the frictional engagement surface 41 of the clutch plate member 42. The outer cylindrical surface of the piston member 43 slides on the inner cylindrical surface 40 of the cavity in the flywheel 23 in a pressure sealed fashion, optionally with the interposition of a seal member therebetween. Thus a pressure chamber 44 is defined to the right of the piston member 43, between it and the flywheel 23. A clutch disk assembly 45 is provided between the piston member 43 and the opposing frictional engagement surface 41 of the clutch plate member 42. This clutch disk assembly 45 comprises a hub member 46 which is rotationally connected by splines to the second driving gear wheel shaft 4, an annular disk plate 48 which is sandwiched between the annular frictional engagement surface 41 of the clutch plate member 42 and the opposing pressure surface of the piston member 43, and a torsional or annular type shock absorber assembly 49 of a per se well known kind which connects the disk plate 48 and the hub member 46 with a certain amount of rotational resilience therebetween. Both the sides of the annular disk plate 48 are faced with high friction type clutch linings 47, so as to have a good frictional effect against the frictional engagement surfaces opposing them. A return spring 50 is fitted between the piston member 43 and the opposing frictional engagement surface 41 of the clutch plate member 42, radially outwards of the annular disk plate 48, so as to bias these members away from one another and so as to tend to decrease the size of the pressure chamber 44. And a hydraulic fluid conduit 51 is formed through the center of the second driving gear wheel shaft 4 and opens to the pressure chamber 44, for selectively supplying pressurized hydraulic fluid to said pressure chamber 44.

Thus, when the hydraulic fluid pressure chamber 44 is not supplied with pressurized hydraulic fluid via the conduit 51 and thus does not drive the piston member 43 to the left, then under the biasing action of the return spring 50 the piston member 43 is impelled in the rightwards direction and thus is not pressed towards the opposing frictional engagement face 41 of the clutch plate member 42. In this operational mode, the annular disk plate 48 is not substantially squeezed between the frictional surface 41 of the clutch plate member 42 and the piston member 43, and accordingly is free to rotate with respect thereto; and thereby the second driving gear wheel shaft 4 is not substantially rotationally powered from the internal combustion engine (not shown). On the other hand, when the hydraulic fluid pressure chamber 44 is supplied with pressurized hydraulic fluid of greater pressure value than a predetermined value via the conduit 51 and thus the piston member 43 is driven to the left, this overcomes the spring action of the spring 50, and in this operational mode the annular disk plate 48 is tightly clamped between the opposing frictional surface 41 of the clutch plate member 42 and the piston member 43, and accordingly is frictionally coupled thereto; and thereby the second driving gear wheel shaft 4 is rotationally powered from the internal combustion engine.

Thus, it will be particularly noted that the functional operations of the first and second clutching assemblies 200 and 201 are opposite: whereas the first clutching assembly 200 is engaged so as to transmit engine rotational power to the first driving gear wheel shaft 3 when its pressure chamber (the chamber 96) is not supplied with hydraulic fluid pressure, and is disengaged so as not to transmit engine rotational power to the first driving gear wheel shaft 3 when its pressure chamber is supplied with hydraulic fluid pressure, by contrast the second clutching assembly 201 is engaged so as to transmit engine rotational power to the second driving gear wheel shaft 4 when its pressure chamber (the chamber 44) is supplied with hydraulic fluid pressure, and is disengaged so as not to transmit engine rotational power to the second driving gear wheel shaft 4 when its pressure chamber is not supplied with hydraulic fluid pressure.

Parallel to the first and second driving gear wheel shafts 3 and 4 and the driven gear wheel shaft 10 there are slidably supported in an upper portion of the transmission casing 52 first and second selector fork shafts 58 and 59. On the first selector fork shaft 58 there is fixedly mounted a first selector fork 60, which can only be partly seen in the sectional view of FIG. 1, and which is engaged with the sleeve 16$f$ of the first-third synchronizer 16 so as selectively to drive said synchronizer sleeve 16$f$ in the left and right directions, along the axial direction of the synchronizer. Likewise, on the second selector fork shaft 59 there is fixedly mounted a second selector fork 61, which also can only be partly seen in the sectional view of FIG. 1, and which is engaged with the sleeve 17$f$ of the second-fourth synchronizer 17 so as selectively to drive said synchronizer sleeve 17$f$ in the left and right directions, along the axial direction of the synchronizer. Further, on this second selector fork shaft 59 there is also slidably mounted a reverse speed selector fork 57, which also can only be partly seen in the sectional view of FIG. 1, and which is engaged with the reverse idler gear wheel 20, so as selectively to drive said reverse idler gear wheel 20 in the left and right directions along the axial direction of the reverse idler gear wheel shaft 19, so as selectively to mesh said reverse idler gear wheel 20 with the reverse speed driving gear wheel 7 and with the reverse speed driven gear wheel 18 formed on the outside of the first-third synchronizer sleeve 16$f$, in order to provide the reverse speed stage. On a left end portion of the first selector fork shaft 58 where it is slidably fitted through a hole in the transmission casing 52 there are formed three axially spaced apart click stop grooves or indentations 62, 63, and 64, and according to the axial position of the first selector fork shaft 58 one or another of these three click stop grooves 62, 63, and 64 is engaged with a ball not shown in the figure which is fitted into an hole in the side of said hole in the transmission casing 52 and which is biased against the side of the shaft 58 by a spring or the like; and similarly on a left end portion of the second selector fork shaft 59 where it is slidably fitted through a hole in the transmission casing 52 there are formed three axially spaced apart click stop grooves or indentations 65, 66, and 67, and according to the axial position of the second selector fork shaft 59 one or another of these three click stop grooves 65, 66, and 67 is engaged with a ball not shown in the figure which is fitted into an hole in the side of said hole in the transmission casing 52 and which is biased against the side of the shaft 59 by a spring or the like.

By means of this click stop mechanism, the first selector fork shaft 58 can be shifted between a central or neutral position in which its said ball is engaged with its central click stop groove 62, a rightwardly shifted position in which its said ball is engaged with its said left click stop groove 63, and a leftwardly shifted position in which its said ball is engaged with its said right click stop groove 64; and when said first selector fork shaft 58 is in any one of its said three positions it is retained therein with a certain holding force by the above described click stop mechanism. Similarly, the second selector fork shaft 59 can be shifted between a central or neutral position in which its said ball is engaged with its said central click stop groove 65, a rightwardly shifted position in which its said ball is engaged with its said left click stop groove 66, and a leftwardly shifted position in which its said ball is engaged with its said right click stop groove 67; and when said second selector fork shaft 59 is in any one of its said three positions it is similarly retained therein with a certain holding force by the above described click stop mechanism. When the first selector fork shaft 58 is in its said central or neutral position, then the first selector fork 60 positions the sleeve 16f of the first-third synchronizer 16 to its intermediate position in which neither the first speed driven gear wheel 11 nor the third speed driven gear wheel 13 is rotationally coupled by the first-third synchronizer 16 to the driven gear wheel shaft 10. When the first selector fork shaft 58 is in its said rightwardly shifted position, then the first selector fork 60 positions the sleeve 16f of the first-third synchronizer 16 to its rightwardly shifted position in which the first speed driven gear wheel 11 is rotationally coupled by the first-third synchronizer 16 to the driven gear wheel shaft 10. On the other hand, when the first selector fork shaft 58 is in its said leftwardly shifted position, then the first selector fork 60 positions the sleeve 16f of the first-third synchronizer 16 to its leftwardly shifted position in which the third speed driven gear wheel 13 is rotationally coupled by the first-third synchronizer 16 to the driven gear wheel shaft 10. Similarly, when the second selector fork shaft 59 is in its said central or neutral position, then the second selector fork 61 positions the sleeve 17f of the second-fourth synchronizer 17 to its intermediate position in which neither the second speed driven gear wheel 12 nor the fourth speed driven gear wheel 14 is rotationally coupled by the second-fourth synchronizer 17 to the driven gear wheel shaft 10. When the second selector fork shaft 59 is in its said rightwardly shifted position, then the second selector fork 61 positions the sleeve 17f of the second-fourth synchronizer 17 to its rightwardly shifted position in which the second speed driven gear wheel 12 is rotationally coupled by the second-fourth synchronizer 17 to the driven gear wheel shaft 10. On the other hand, when the second selector fork shaft 59 is in its said leftwardly shifted position, then the second selector fork 61 positions the sleeve 17f of the second-fourth synchronizer 17 to its leftwardly shifted position in which the fourth speed driven gear wheel 14 is rotationally coupled by the second-fourth synchronizer 17 to the driven gear wheel shaft 10.

The first and second selector fork shafts 58 and 59 and the reverse speed selector fork 57 are driven between their positions explained above by hydraulic drive mechanisms which will now be described.

On the left hand end of the transmission casing 52 there is fitted an end cover 70, through which there are pierced two holes which oppose the left hand ends of the first and second selector fork shafts 58 and 59, which are formed with notch shapes. To this end cover 70 are fixed the casings of first and second hydraulic actuators 68 and 69. Within the casing of the first hydraulic actuator 68 there is slidably fitted a first piston member 71, the right hand end of which protrudes from the casing and is formed with a notch shape which is drivingly engaged with the notch shape formed on the left hand end of the first selector fork shaft 58, so as to push and pull it. Pressure chambers 72 and 73 are respectively defined to the left and the right of this piston member 71 within the casing of the hydraulic actuator, and opposing compression coil springs 74 and 75 respectively mounted within the pressure chamber 72 and the pressure chamber 73 bias this piston member 71 together with the first selector fork shaft 58 respectively to the right and the left in FIG. 1. Similarly, within the casing of the second hydraulic actuator 69 there is slidably fitted a second piston member 76, the right hand end of which protrudes from the casing and is formed with a notch shape which is drivingly engaged with the notch shape formed on the left hand end of the second selector fork shaft 59, so as to push and pull it. Pressure chambers 77 and 78 are respectively defined to the left and the right of this piston member 76 within the casing of the hydraulic actuator, and opposing compression coil springs 79 and 80 respectively mounted within the pressure chamber 77 and the pressure chamber 78 bias this piston member 76 together with the second selector fork shaft 59 respectively to the right and the left in FIG. 1. To the pressure chambers 73, 74, 77, and 78 there are respectively communicated hydraulic fluid conduits 122, 120, 121, and 123.

Thus, when pressurized hydraulic fluid is supplied neither to the pressure chamber 72 of the first hydraulic actuator 68 via the hydraulic fluid conduit 120 nor to its pressure chamber 73 via the hydraulic fluid conduit 122, then under the biasing actions of the compression coil springs 74 and 75 the piston member 71 thereof is shifted so as to position the first selector fork shaft 58 to its central or neutral position, in which its said ball is engaged with its said central click stop groove 62, and in which the first selector fork 60 positions the sleeve 16f of the first-third synchronizer 16 to its intermediate position in which neither the first speed driven gear wheel 11 nor the third speed driven gear wheel 13 is rotationally coupled by the first-third synchronizer 16 to the driven gear wheel shaft 10. When pressurized hydraulic fluid is supplied via the hydraulic fluid conduit 120 to the pressure chamber 72 of the first hydraulic actuator 68, then with the aid of the biasing action of the compression coil spring 74 and against the biasing action of the compression coil spring 75 which is overcome the piston member 71 thereof is shifted to the right, with a shifting force which is greater the greater is the magnitude of the pressure of such supplied hydraulic fluid, so as to position the first selector fork shaft 58 to its said rightwardly shifted position, in which its said ball is engaged with its said left click stop groove 63, and in which the first selector fork 60 positions the sleeve 16f of the first-third synchronizer 16 to its said rightwardly shifted position in which the first speed driven gear wheel 11 is rotationally coupled by the first-third synchronizer 16 to the driven gear wheel shaft 10. On the other hand, when pressurized hydraulic fluid is supplied via the hydraulic fluid condut 122 to the pressure chamber 73 of the first hydraulic actuator 68, then with the aid of the biasing action of the compression coil spring 75 and against the biasing action of the compression coil spring 74 which is overcome the piston member 71 thereof is shifted to the left, again with a shifting force which is greater the greater is the magnitude of the pressure of such supplied hydraulic fluid, so as to position the first selector fork shaft 58 to its said leftwardly shifted position, in which its said ball is engaged with its said right click stop groove 64, and in which the first selector fork 60 positions the sleeve 16f of the first-third synchronizer 16 to its said leftwardly shifted position in which the third speed driven gear wheel 13 is rotationally coupled by the first-third synchronizer 16 to the driven gear wheel shaft 10.

Similarly, when pressurized hydraulic fluid is supplied neither to the pressure chamber 77 of the second hydraulic actuator 69 via the hydraulic fluid conduit 121 nor to its pressure chamber 78 via the hydraulic fluid conduit 123, then under the biasing actions of the compression coil springs 79 and 80 the piston member 76 thereof is shifted so as to position the second selector fork shaft 59 to its central or neutral position, in which its said ball is engaged with its said central click stop groove 65, and in which the second selector fork 61 positions the sleeve 17f of the second-fourth synchronizer 17 to its intermediate position in which neither the second speed driven gear wheel 12 nor the fourth speed driven gear wheel 14 is rotationally coupled by the second-fourth synchronizer 17 to the driven gear wheel shaft 10. When pressurized hydraulic fluid is supplied via the hydraulic fluid conduit 121 to the pressure chamber 77 of the second hydraulic actuator 69, then with the air of the biasing action of the compression coil spring 79 and against the biasing action of the compression coil spring 80 which is overcome the piston member 76 thereof is shifted to the right, with a shifting force which is greater the greater is the magnitude of the pressure of such supplied hydraulic fluid, so as to position the second selector fork shaft 59 to its said rightwardly shifted position, in which its said ball is engaged with its said left click stop groove 66, and in which the second selector fork 61 positions the sleeve 17f of the second-fourth synchronizer 17 to its said rightwardly shifted position in which the second speed driven gear wheel 12 is rotationally coupled by the second-fourth synchronizer 17 to the driven gear wheel shaft 10. On the other hand, when pressurized hydraulic fluid is supplied via the hydraulic fluid conduit 123 to the pressure chamber 78 of the second hydraulic actuator 69, then with the aid of the biasing action of the compression coil spring 80 and against the biasing action of the compression coil spring 79 which is overcome the piston member 76 thereof is shifted to the left, again with a shifting force which is greater the greater is the magnitude of the pressure of such supplied hydraulic fluid, so as to position the second selector fork shaft 59 to its said leftwardly shifted position, in which its said ball is engaged with its said right click stop groove 67, and in which the second selector fork 61 positions the sleeve 17f of the second-fourth synchronizer 17 to its said leftwardly shifted position in which the fourth speed driven gear wheel 14 is rotationally coupled by the second-fourth synchronizer 17 to the driven gear wheel shaft 10.

Figure 3:
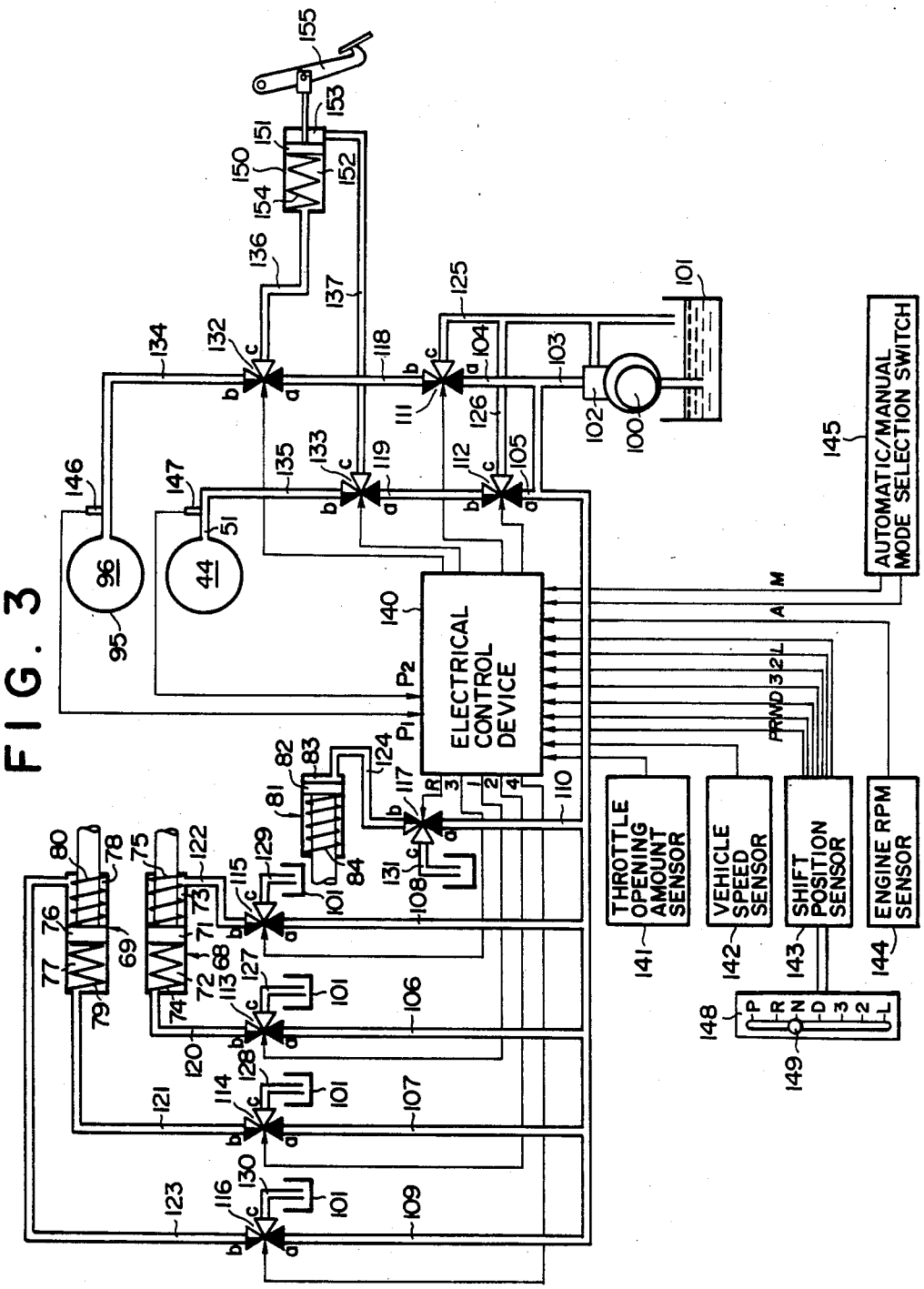
FIG. 3 is a schematic view, in part block diagrammatical form, showing part of a combination electric/hydraulic control system for the transmission mechanism of FIG. 1, and elements associated therewith, these parts all being incorporated in said preferred embodiment of the transmission system according to the present invention.

Finally, the reverse speed selector fork 57 is selectively driven to and fro to the left and right in FIG. 1 by a hydraulic actuator 81, which is not shown in FIG. 1 but is shown in FIG. 3. When the pressure chamber 83 of this hydraulic actuator 81 is not supplied with pressurized hydraulic fluid, then by the biasing action of a compression coil spring 84 the piston 82 is driven to the right in FIG. 3, and via a linkage which is not shown this piston 82 thereby shifts the reverse speed selector fork 57 in the rightwards direction in FIG. 1, so as to disengage the reverse idler gear wheel 20 from the reverse speed driving gear wheel 7 and from the reverse speed driven gear wheel 18 formed on the outside of the first-third synchronizer sleeve 16f. On the other hand, when the pressure chamber 83 of this hydraulic actuator 81 is supplied with pressurized hydraulic fluid, then against the biasing action of the compression coil spring 84 which is overcome the piston 82 is driven to the left in FIG. 3, and via the aforesaid linkage the piston 82 thereby shifts the reverse speed selector fork 57 in the leftwards direction in FIG. 1, so as to mesh the reverse idler gear wheel 20 with the reverse speed driving gear wheel 7 and with the reverse speed driven gear wheel 18, so as to provide the reverse speed stage.

Now, referring to FIG. 3, the arrangements for providing selective engagement and disengagement of the first and second clutch assemblies 200 and 201 by selectively providing supply of hydraulic fluid pressure to the pressure chambers 44 and 96, and for moving the selector forks 57, 60 and 61 by selectively providing supply of hydraulic fluid pressure to the pressure chambers 83, 72, 73, 77, and 78, will be described. As will be shortly seen, this transmission mechanism shown in FIGS. 1 and 2 can be thus operated either as a fully automatic transmission system or as a manual transmission system, and the choice between these two operational modes can be made by the vehicle operator simply by operating a switch.

A hydraulic fluid pump 100 sucks up hydraulic fluid from a pan 101, and the pressure of this hydraulic fluid is regulated to a line hydraulic fluid pressure by a line pressure regulation valve 102 of a per se well known sort. From this line pressure regulation valve 102, via a hydraulic fluid conduit 103, and then via hydraulic fluid conduits 104, 105, 106, 107, 108, 109, and 110 respectively, hydraulic fluid at substantially line pressure is led to input ports designated as "a" of seven electromagnetic fluid switching valves, which are respectively designated as 111, 112, 113, 114, 115, 116, and 117, and which are only schematically shown because they are per se well known. These electromagnetic fluid switching valves are all of substantially identical construction and function, and each of them has three ports designated as "a", "b", and "c", and functions as follows: when its solenoid (not shown) is supplied with actuating electrical energy then its port "a" is communicated to its port "b" while its port "c" is not communicated to any other port, and on the other hand when its solenoid is not supplied with actuating electrical energy then its port "b" is communicated to its port "c" while its port "a" is not communicated to any other port. Thus, when the solenoid of each of these electromagnetic fluid switching valves 111 through 117 is supplied with an electrical pulse signal with a certain duty ratio, the effective fluid flow resistance between its port "a" and its port "b" varies according to the duty ratio of said certain pulse signal, being the less the greater is said duty ratio; and correspondingly the effective fluid flow resistance between its port "b" and its port "c" also varies according to the duty ratio of said certain pulse signal, being the greater the greater is said duty ratio. The ports "c" of the electromagnetic fluid switching valves 111, 112, 113, 114, 115, 116, and 117 are all communicated via drain hydraulic fluid conduits 125, 126, 127, 128, 129, 130, and 131 respectively to the hydraulic fluid pan 101.

Now, the other connections of the five electromagnetic fluid switching valves 113 through 117 are as follows. The port "b" of the electromagnetic fluid switching valve 113 is communicated via the previously mentioned hydraulic fluid conduit 120 to the pressure chamber 72 of the first hydraulic actuator 68 which is for driving the first selector fork shaft 58, the first selector fork 60, and thereby the first-third selector sleeve 16f of the first-third synchronizer 16 rightwards, i.e. for engaging the first speed stage. The port "b" of the electromagnetic fluid switching valve 114 is communicated via the previously mentioned hydraulic fluid conduit 121 to the pressure chamber 77 of the second hydraulic actuator 69 which is for driving the second selector fork shaft 59, the second selector fork 61, and thereby the second-fourth selector sleeve 17f of the second-fourth synchronizer 17 rightwards, i.e. for engaging the second speed stage. The port "b" of the electromagnetic fluid switching valve 115 is communicated via the previously mentioned hydraulic fluid conduit 122 to the pressure chamber 73 of the first hydraulic actuator 68 which is for driving the first selector fork shaft 58, the first selector fork 60, and thereby the first-third selector sleeve 16f of the first-third synchronizer 16 leftwards, i.e. for engaging the third speed stage. The port "b" of the electromagnetic fluid switching valve 116 is communicated via the previously mentioned hydraulic fluid conduit 123 to the pressure chamber 78 of the second hydraulic actuator 69 which is for driving the second selector fork shaft 59, the second selector fork 61, and thereby the second-fourth selector sleeve 17f of the second-fourth synchronizer 17 leftwards, i.e. for engaging the fourth speed stage. Finally, the port "b" of the electromagnetic fluid switching valve 117 is communicated via a hydraulic fluid conduit 124 to the pressure chamber 83 of the aforementioned hydraulic actuator 81 which is for driving the reverse speed selector fork 57 and the reverse idler gear wheel 20 in the leftwards direction, i.e. for engaging the reverse speed stage.

On the other hand, the other connections of the two electromagnetic fluid switching valves 11 and 112 are as follows. The port "b" of the electromagnetic fluid switching valve 111 is communicated via a hydraulic fluid conduit 118 to a port "a" of another electromagnetic fluid switching valve 132, a port "b" which is communicated via a hydraulic fluid conduit 134 to the pressure chamber 96 of the hydraulic actuator 95 for the clutch fork member 34 of the first clutch assembly 200. The port "b" of the electromagnetic fluid switching valve 112 is communicated via a hydraulic fluid conduit 119 to a port "a" of another electromagnetic fluid switching valve 133, a port "b" of which is communicated via a hydraulic fluid conduit 135 and via the previously mentioned hydraulic fluid conduit 51 formed through the center of the second driving gear wheel shaft 4 to the pressure chamber 44 of the second clutch assembly 201. These two electromagnetic fluid switching valves 132 and 133 are of substantially identical construction and function to the previously described valves 111 through 117, and each of them functions in the same way, so that when its solenoid (not shown) is supplied with actuating electrical energy then its port "a" is communicated to its port "b" while its port "c" is not communicated to any other port, and on the other hand when its solenoid is not supplied with actuating electrical energy then its port "b" is communicated to its port "c" while its port "a" is not communicated to any other port.

The port "c" of the electromagnetic fluid switching valve 132 is connected via a hydraulic fluid conduit 136 to the pressure side of a clutch master cylinder device 150, and the port "c" of the electromagnetic fluid switching valve 133 is connected via a hydraulic fluid conduit 137 to the suction side of the clutch master cylinder device 150. The clutch master cylinder device 150 comprises a casing and a piston 151 which slides in a cylindrical bore in the casing, and a suction chamber 153 is defined to one side of the piston 151 to which the conduit 137 is communicated, while a pressure chamber 152 is defined to the other side of the piston 151 to which the conduit 136 is communicated. A clutch pedal 155 is connected to the piston 151 to move it in such a way that: when the clutch pedal 155 is depressed by the foot of a vehicle operator so that its pad is moved leftwards in FIG. 3, the piston 151 is moved leftwards so as to compress the hydraulic fluid in the pressure chamber 152 and to expel it into the hydraulic fluid conduit 136, and so as simultaneously to depressurize the hydraulic fluid in the suction chamber 153 and to suck more of it in from the hydraulic fluid conduit 137; while, on the other hand, when the clutch pedal 155 is released by the foot of said vehicle operator so that its pad is moved rightwards in FIG. 3, the piston 151 is moved rightwards so as to to depressurize the hydraulic fluid in the pressure chamber 152 and suck more of it in from the hydraulic fluid conduit 136, and so as simultaneously to compress the hydraulic fluid in the suction chamber 153 and to expel it into the hydraulic fluid conduit 137. A return spring 154 is provided in the pressure chamber 152 so as to push the pad of the clutch pedal 155 to the right in FIG. 3, i.e. upwards, and so as to tend to increase the size of the pressure chamber 152 and to decrease the size of the suction chamber 153.

The selective supply of electrical energy, i.e. of pulse signals of various duty ratios and of ON/OFF signals, to the solenoids of each of the nine electromagnetic fluid switching valves 111, 112, 113, 114, 115, 116, 117, 132, and 133 is performed from an electrical control device 140, the internal construction of which will not be explained in detail here because it is generally per se well known and conventional, and because the particular features thereof which are specific to the shown preferred embodiment will be easily supplemented by one of ordinary skill in the electronic and programming arts, based upon the functional disclosures in this specification. In the shown preferred embodiment, this electrical control device 140 may comprise a microprocessor and one or more pulse signal generators controlled by said microprocessor which can generate pulse signals of any desired duty ratio within a certain range, and also may comprise a multiplexer or the like for directing said pulse signals to one or more of the solenoids of the seven electromagnetic fluid switching valves 111, 112, 113, 114, 115, 116, and 117 and for directing ON/OFF signals to the two electromagnetic fluid switching valves 132 and 133. In any case, the electrical control device 140 receives information relating to the operational conditions of the transmission system shown in FIG. 2 and the operational conditions of the vehicle in which said transmission system is incorporated and the requirements of the operator thereof from, in this preferred embodiment of the present invention: a throttle opening amount sensor 141 which produces an electrical output signal representative of the current throttle opening amount of the engine (not shown) of the vehicle, i.e. of the current value of the load on said engine; a vehicle speed sensor 142 which produces an electrical output signal representative of the current value of the road speed of the vehicle; a shift position sensor 143 which produces an electrical output signal representative of the desired transmission range or speed stage which is currently manually selected on a transmission control board 148 by the driver of the vehicle by moving a control knob 149 thereon, as will be explained in detail shortly; an engine rpm sensor 144 which produces an electrical output signal representative of the current value of the rotational speed of the engine (not shown) of the vehicle; an AUTOMATIC/MANUAL mode selection switch 145 which is positioned in a convenient position within the driving compartment of the vehicle to be switched to and fro according to the desire of the vehicle operator; and two hydraulic fluid pressure sensors 146 and 147 which are provided respectively to sense the hydraulic fluid pressure in the pressure chamber 96 of the actuator 95 for the first clutching assembly 200 and in the pressure chamber 44 of the second clutching assembly 201. Based upon this and possibly other information, the electrical control device 140 decides which speed stage of the transmission mechanism shown in FIG. 1 should currently be engaged or should be shifted to, by appropriate shifting of the first and second synchronizer sleeves 16f and 17f and by appropriate engagement of the first and second clutching assemblies 200 and 201, and outputs suitable electrical pulse signals and ON/OFF signals to one or more of the solenoids of the nine electromagnetic fluid switching valves 111, 112, 113, 114, 115, 116, 117, 132, and 133, for causing the shift forks 60, 61, and 57 and the first and second clutch assemblies 200 and 201 to be moved and engaged as explained in the appropriate part of the description given below with respect to the operation of the transmission system in each of its speed stages and with respect to the shifting between said speed stages, in the full automatic mode and also in the manual mode.

The driver of the vehicle can move the control knob 149 to any of the following positions on the transmission control board 148: a position designated in FIG. 3 as "P" which represents "P" or parking range when the AUTOMATIC/MANUAL mode selection switch 145 is set to the AUTOMATIC setting for the transmission to function as an automatic transmission and which represents the neutral speed stage with the transmission locked when said switch 145 is set to the MANUAL setting for the transmission to function as a manual transmission; a position designated as "R" which represents "R" or reverse range when the AUTOMATIC/MANUAL mode selection switch 145 is set to the AUTOMATIC setting and which represents the reverse speed stage when said switch 145 is set to the MANUAL setting; a position designated as "N" which represents "N" or neutral range when the AUTOMATIC/MANUAL mode selection switch 145 is set to the AUTOMATIC setting and which represents the neutral speed stage when said switch 145 is set to the MANUAL setting; a position designated as "D" which represents "D" or drive range when the AUTOMATIC/MANUAL mode selection switch 145 is set to the AUTOMATIC setting and which represents the fourth speed stage when said switch 145 is set to the MANUAL setting; a position designated as "3" which represents "3" or third range when the AUTOMATIC/MANUAL mode selection switch 145 is set to the AUTOMATIC setting and which represents the third speed stage when said switch 145 is set to the MANUAL setting; a position designated as "2" which represents "2" or second range when the AUTOMATIC/MANUAL mode selection switch 145 is set to the AUTOMATIC setting and which represents the second speed stage when said switch 145 is set to the MANUAL setting; and a position designated as "L" which represents "L" or low range when the AUTOMATIC/MANUAL mode selection switch 145 is set to the AUTOMATIC setting and which represents the first speed stage when said switch 145 is set to the MANUAL setting. This position of the control knob 149 on the transmission control board 148 is sensed by the shift position sensor 143 which sends an electrical signal representative thereof to the electrical control device 140. Similarly, the position of a switched member of the AUTOMATIC/MANUAL mode selection switch 145 is converted to an electrical signal in said switch and is sent to the electrical control device 140.

In actual detail, the electrical control device 140, during the process of engaging a speed stage or of preparing to do so by shifting a one of the first-third and the second-fourth synchronizer sleeves 16f and 17f to the left or to the right in FIG. 1 and during the process of engaging or disengaging a one of the first and second clutching assemblies 200 and 201, may output to the solenoid of a particular one or more of the seven electromagnetic fluid switching valves 111, 112, 113, 114, 115, 116, and 117 not a simple ON/OFF signal but instead a pulse signal of a certain duty ratio, so as to cause said one of the electromagnetic switching valves to supply a hydraulic fluid pressure which is neither zero nor line pressure but intermediate therebetween from its port "b" to its associated one of the pressure chambers 96, 44, 72, 77, 73, 78, and 82 via the associated one of the hydraulic fluid conduits 118 through 124 (and in the case of the pressure chambers 96 and 44 of the first and second clutching assemblies 200 and 201 also via the electromagnetic switching valves 132 and 133). Thus, during the ON time periods of this pulse signal said pressure chamber is communicated via the port "b" of said electromagnetic fluid switching valve to the port "a" thereof so as to receive supply of line hydraulic fluid pressure; but on the other hand during the OFF time periods of said pulse signal said pressure chamber is communicated via the port "b" of said electromagnetic fluid switching valve to the port "c" thereof so as to be drained. Therefore, the greater is the duty ratio of this pulse signal supplied to the solenoid of the electromagnetic fluid switching valve, the greater is the balance value of the hydraulic fluid pressure which is thus caused to be present in said pressure chamber, from a zero pressure value in said pressure chamber when said duty ratio is zero up to a line pressure value in said pressure chamber when said duty ratio is unity. In this way, the electrical control device 140 can control the pressure value in any of the pressure chambers 96, 44, 72, 77, 73, 78, and 82 to be substantially any desired pressure value from substantially zero up to substantially line pressure, i.e. to be any desired value in a particular range. However, this function of supplying a particular desired hydraulic fluid pressure value intermediate between zero and line pressure to the various pressure chambers in only used during the transient process of shifting between speed stages of the transmission for better and smoother engagement of the synchronizer sleeves and the clutches, and at all other times either zero or line pressure is supplied to each of the pressure chambers, i.e. only either on ON signal or an OFF signal is supplied to each of the electromagnetic switching valves. Since this transient intermediate pressure supply is not actually essential to the principles of the present invention, in the following this function will be ignored, and the operation will be discussed as though at all times only either zero pressure or line pressure were supplied to the pressure chambers, thus not considering the details of such transient operation. In other words, the duty ratio of the signals supplied to the various electromagnetic fluid switching valves will be taken as being only either zero or unity; i.e., these signals will be discussed as though they were only ON/OFF signals.

First, the operation of the shown transmission system will be explained, in the case that the AUTOMATIC/MANUAL mode selection switch 145 is set to the AUTOMATIC setting, so that the transmission system functions in the full automatic mode as an automatic transmission.

In this case, the electrical control device 140 steadily outputs ON electrical signals to the electromagnetic fluid switching valves 132 and 133, so as to keep their ports "b" communicated to their ports "a", and thus the clutch master cylinder device 150 is disconnected from the transmission and its operation is irrelevant thereto, with the port "b" of the electromagnetic fluid switching valve 111 communicated via the hydraulic fluid conduits 118 and 134 straight to the pressure chamber 96 of the actuator 95 for the first clutching assembly 200, and with the port "b" of the electromagnetic fluid switching valve 112 communicated via the hydraulic fluid conduits 119 and 135 straight to the pressure chamber 44 of the first clutching assembly 201.

The engagement conditions of each of the first and second clutch assemblies 200 and 201, the positions of the first-third synchronizer sleeve 16f of the first-third synchronizer 16 and of the second-fourth synchronizer sleeve 17f of the second-fourth synchronizer 17, and the position of the reverse idler gear wheel 20 on the reverse idler gear wheel shaft 19, will now be explained, during the engagement of each of the speed stages which can be provided by the transmission mechanism shown in FIG. 1 and explained above, i.e. during the engagement of the neutral speed stage, the reverse speed stage, and the first through the fourth forward speed stages, while as specified above the AUTOMATIC/MANUAL mode selection switch 145 is set to the AUTOMATIC setting so that the transmission system functions in the full automatic mode as an automatic transmission; and also the sequences of shifting and of engagement and disengagement operations of these means which are employed in the various possible operations of shifting between these speed stages in this full automatic mode will be generally explained. In this connection, the ranges of the transmission which can be set on the transmission control board 148 by moving the control knob 149 thereon have their usual and well understood meanings as common in the transmission art: only the neutral speed stage is engaged in the "P" or parking range and the "N" or neutral range; only the reverse speed stage is engaged in the "R" or reverse range; only the first speed stage is engaged in the "L" or low range; the first or the second speed stage may be engaged in the "2" or second range, according to vehicle operational parameters such as vehicle road speed and engine load; the first, the second, or the third speed stage may be engaged in the "3" or third range, according to such vehicle operational parameters; and the first, the second, the third, or the fourth speed stage may be engaged in the "D⇌" or drive range, again according to such vehicle operational parameters. In the case of the "2" or second range, the "3" or third range, or the "D" or drive range, the selection of exactly which speed stage should be currently engaged is decided upon by the electrical control device 140, based upon said vehicle operational parameters, in a per se well known way for automatic transmission control, as for example based upon predetermined transmission shifting patterns stored in a memory of the electrical control device 140, and this matter will not be particularly further discussed herein because it is per se conventional.

During vehicle operation in the parking and in the neutral speed stage, the first-third synchronizer sleeve 16f of the first-third synchronizer 16 and of the second-fourth synchronizer sleeve 17f of the second-fourth synchronizer 17 are both positioned to their central or intermediate positions, by supply of an OFF electrical signal by the electrical control device 140 to all of the electromagnetic fluid switching valves 113, 114, 115, and 116, which accordingly causes the pressure chambers 72, 73, 77, and 78 of the first and second hydraulic actuators 68 and 69 to be all drained; and the first and second clutch assemblies 200 and 201 are both likewise disengaged, by supply of an ON electrical signal by the electrical control device 140 to the electromagnetic fluid switching valve 111, which causes the pressure chamber 96 of the actuator 95 of the first clutching assembly 200 to be supplied with line pressure, and by supply of an OFF electrical signal by the electrical control device 140 to the electromagnetic fluid switching valve 112, which causes the pressure chamber 44 of the second clutching assembly 201 to be drained and to be supplied with substantially zero pressure, although in fact the engagement condition of the second clutch assembly 201 is irrelevant. However, when it is desired to engage the first speed stage from the neutral speed stage, and to move the vehicle away from rest, first as a preparatory step, by supply of an ON electrical signal by the electrical control device 140 to the electromagnetic fluid switching valve 113, which causes the pressure chamber 72 of the first hydraulic actuator 68 to be supplied with line pressure, the first-third synchronizer sleeve 16f of the first-third synchronizer 16 is shifted to its rightwards position so as to rotationally engage the first speed driven gear wheel 11 with the driven gear wheel shaft 10, but at this time no drive will be transferred by this rotational engagement because the first clutch assembly 200 is disengaged. Then, in order to actually engage this first speed stage, the first clutch assembly 200 is engaged, by supply of an OFF electrical signal by the electrical control device 140 to the electromagnetic fluid switching valve 111, which causes the pressure chamber 96 of the hydraulic actuator 95 to be supplied with a substantially zero pressure. This will cause the vehicle to move away smoothly from rest, as the first clutching assembly 200 is progressively engaged.

Thus, during vehicle operation in the first forward speed stage, the first-third synchronizer sleeve 16f of the first-third synchronizer 16 is positioned to its rightwards position, so as to rotationally engage the first speed driven gear wheel 11 with the driven gear wheel shaft 10, and the second-fourth synchronizer sleeve 17f of the second-fourth synchronizer 17 is positioned to its central or intermediate position, and the first clutch assembly 200 is kept engaged while the engagement condition of the second clutch assembly 201 is irrelevant, by supply of an ON electrical signal by the electrical control device 140 to the electromagnetic fluid switching valve 113, and by supply of OFF electrical signals by the electrical control device 140 to the electromagnetic fluid switching valves 111, 112, 114, 115, 116, and 17 (and as stated above 132 and 133, always during this AUTOMATIC operational mode), which causes the pressure chamber 72 of the first hydraulic actuator 68 to be supplied with line pressure, while the pressure chambers 73, 77, 78, 82, 96, and 44 are not supplied with any substantial pressures. Thus rotational power is transmitted from the crankshaft (not shown) of the internal combustion engine (also not shown) via the flywheel 23 and via the first clutch assembly 200 to the first driving gear wheel shaft 3, whence it is transmitted through the first speed driving gear wheel 5 to the first speed driven gear wheel 11 constantly meshed therewith, whence said drive is transmitted to the driven gear wheel shaft 10 to which said first speed driven gear wheel 11 is currently engaged by the first-third synchronizer 16, whence it is output via the power output gear wheel 15 to the differential gear mechanism 85. However, when it is desired to shift up to the second speed stage from the first speed stage, as a preparatory step first it is ensured that the second clutch assembly 201 is disengaged, i.e. that an OFF electrical signal is being sent by the electrical control device 140 to the electromagnetic fluid switching valve 112, and then, by supply of an ON electrical signal by the electrical control device 140 to the electromagnetic fluid switching valve 114, which causes the pressure chamber 77 of the second hydraulic actuator 69 to be supplied with line pressure, the second-fourth synchronizer sleeve 17f of the second-fourth synchronizer 17 is shifted to its rightwards position, so as to rotationally engage the second speed driven gear wheel 12 with the driven gear wheel shaft 10, but at this time no drive will be transferred by this rotational engagement because the second clutch assembly 201 is disengaged. Then, in order to actually engage this second speed stage, i.e. to perform the upshift, which as stated earlier is done when the electrical control device 140 decides that the appropriate time has come to do so based upon various vehicle operational parameters, then the first clutch assembly 200 is disengaged and the second clutch assembly 201 is engaged, with a good mutual timing being maintained during this switching over of engagement conditions, by supply of an ON electrical signal by the electrical control device 140 to the electromagnetic fluid switching valve 111, which causes the pressure chamber 96 of the actuator 95 of the first clutching assembly 200 to be supplied with line pressure, and by supply of an ON electrical signal by the electrical control device 140 to the electromagnetic fluid switching valve 112, which causes the pressure chamber 44 of the second clutching assembly 201 to be also supplied with line pressure. Later, at a convenient time, the first-third synchronizer sleeve 16f of the first-third synchronizer 16 is brought back to its neutral or intermediate position, by supply of an OFF electrical signal by the electrical control device 140 to the electromagnetic fluid switching valve 113, which causes the pressure chamber 72 of the first hydraulic actuator 68 to be supplied with substantially zero pressure, and thereafter the first clutch assembly 200 is kept disengaged.

Thus, during vehicle operation in the second forward speed stage, the second-fourth synchronizer sleeve 17f of the second-fourth synchronizer 17 is positioned to its rightwards position, so as to rotationally engage the second speed driven gear wheel 12 with the driven gear wheel shaft 10, and the first-third synchronizer sleeve 16f of the first-third synchronizer 16 is positioned to its central or intermediate position, and the second clutch assembly 201 is kept engaged while the first clutch assembly 200 is kept disengaged, by supply of ON electrical signals by the electrical control device 140 to the electromagnetic fluid switching valves 111, 112 and 114, and by supply of OFF electrical signals by the electrical control device 140 to the electromagnetic fluid switching valves 113, 115, 116, and 117, which causes the pressure chamber 77 of the second hydraulic actuator 69, the pressure chamber 96 of the actuator 95 of the first clutching assembly 200, and the pressure chamber 44 of the second clutching assembly 201 to be supplied with line pressure, while the pressure chambers 72, 73, 78, and 82 are not supplied with any substantial pressures. Thus rotational power is transmitted from the crankshaft of the internal combustion engine via the flywheel 23 and via the second clutch assembly 201 to the second driving gear wheel shaft 4, whence it is transmitted through the second speed driving gear wheel 8 to the second speed driven gear wheel 12 constantly meshed therewith, whence said drive is transmitted to the driven gear wheel shaft 10 to which said second speed driven gear wheel 12 is currently engaged, whence it is output via the power output gear wheel 15 to the differential gear mechanism 85. However, when it is desired to shift up to the third speed stage from the second speed stage, or alternatively down to the first speed stage, respectively, first as a preparatory step, by supply of an ON electrical signal by the electrical control device 140 to either the electromagnetic fluid switching valve 115 or the electromagnetic fluid switching valve 113, which causes respectively either the pressure chamber 73 or the pressure chamber 72 of the first hydraulic actuator 68 to be supplied with line pressure, the first-third synchronizer sleeve 16f of the first-third synchronizer 16 is shifted respectively either to its leftwards or to its rightwards position, so as to rotationally engage either the third speed driven gear wheel 13 or the first speed driven gear wheel 11 with the driven gear wheel shaft 10, but at this time no drive will be transferred by this rotational engagement because the first clutch assembly 200 is still disengaged. Then, in order to actually engage respectively either the third or the first speed stage, i.e. to perform the respective upshift or downshift, the first clutch assembly 200 is engaged and the second clutch assembly 201 is disengaged, again with a good mutual timing being maintained during this switching over of engagement conditions, by supply of an OFF electrical signal by the electrical control device 140 to the electromagnetic fluid switching valve 111, which causes the pressure chamber 96 of the actuator 95 of the first clutching assembly 200 to be supplied with substantially zero pressure, and by supply of an OFF electrical signal by the electrical control device 140 to the electromagnetic fluid switching valve 112, which causes the pressure chamber 44 of the second clutching assembly 201 to be also supplied with substantially zero pressure. Later, at a convenient time, the second-fourth synchronizer sleeve 17f of the second-fourth synchronizer 17 is brought back to its neutral or intermediate position, by supply of an OFF electrical signal by the electrical control device 140 to the electromagnetic fluid switching valve 114, which causes the pressure chamber 77 of the second hydraulic actuator 69 to be supplied with substantially zero pressure, and thereafter the engagement condition of the second clutch assembly 201 becomes irrelevant.

Thus, during vehicle operation in the third forward speed stage, the first-third synchronizer sleeve 16f of the first-third synchronizer 16 is positioned to its leftwards position, so as to rotationally engage the third speed driven gear wheel 13 with the driven gear wheel shaft 10, and the second-fourth synchronizer sleeve 17f of the second-fourth synchronizer 17 is positioned to its central or intermediate position, and the first clutch assembly 200 is kept engaged while the second clutch assembly 201 is kept disengaged, by supply of an ON electrical signal by the electrical control device 140 to the electromagnetic fluid switching valve 115, and by supply of OFF electrical signals by the electrical control device 140 to the electromagnetic fluid switching valves 111, 112, 113, 114, 116, and 117, which causes the pressure chamber 73 of the first hydraulic actuator 68 to be supplied with line pressure, while the pressure chambers 72, 73, 78, 82, 96, and 44 are not supplied with any substantial pressures. Thus rotational power is transmitted from the crankshaft of the internal combustion engine via the flywheel 23 and via the first clutch assembly 200 to the first driving gear wheel shaft 3, whence it is transmitted through the third speed driving gear wheel 6 to the third speed driven gear wheel 13 constantly meshed therewith, whence said drive is transmitted to the driven gear wheel shaft 10 to which said third speed driven gear wheel 13 is currently engaged, whence it is output via the power output gear wheel 15 to the differential gear mechanism 85. However, when it is desired to shift up to the fourth speed stage from the third speed stage, or alternatively down to the second speed stage, respectively, as a preparatory step first it is ensured that the second clutch assembly 201 is disengaged, and then by supply of an ON electrical signal by the electrical control device 140 to either the electromagnetic fluid switching valve 116 or the electromagnetic fluid switching valve 114, which causes respectively either the pressure chamber 78 or the pressure chamber 77 of the second hydraulic actuator 69 to be supplied with line pressure, the second-fourth synchronizer sleeve 17f of the second-fourth synchronizer 17 is shifted respectively either to its leftwards or to its rightwards position, so as to rotationally engage either the fourth speed driven gear wheel 14 or the second speed driven gear wheel 12 with the driven gear wheel shaft 10, but at this time no drive will be transferred by this rotational engagement because the second clutch assembly 201 is disengaged. Then, in order to actually engage respectively either the fourth or the second speed stage, i.e. to perform the respective upshift or downshift, the second clutch assembly 201 is engaged and the first clutch assembly 200 is disengaged, again with a good mutual timing being maintained during this switching over of engagement conditions, by supply of an ON electrical signal by the electrical control device 140 to the electromagnetic fluid switching valve 111, which causes the pressure chamber 96 of the actuator 95 of the first clutching assembly 200 to be supplied with line pressure, and by supply of an ON electrical signal by the electrical control device 140 to the electromagnetic fluid switching valve 112, which causes the pressure chamber 44 of the second clutching assembly 201 to be also supplied with line pressure. Later, at a convenient time, the first-third synchronizer sleeve 16f of the first-third synchronizer 16 is brought back to its neutral or intermediate position, and thereafter the first clutch assembly 200 is kept disengaged.

Thus, during vehicle operation in the fourth forward speed stage, the second-fourth synchronizer sleeve 17f of the second-forth synchronizer 17 is positioned to its leftwards position, so as to rotationally engage the fourth speed driven gear wheel 14 with the driven gear wheel shaft 10, and the first-third synchronizer sleeve 16f of the first-third synchronizer 16 is positioned to its central or intermediate position, and the second clutch assembly 201 is kept engaged while the first clutch assembly 200 is kept disengaged, by supply of ON electrical signals by the electrical control device 140 to the electromagnetic fluid switching valves 111, 112 and 116, and by supply of OFF electrical signals by the electrical control device 140 to the electromagnetic fluid switching valves 113, 114, 115, and 117, which causes the pressure chamber 78 of the second hydraulic actuator 69, the pressure chamber 96 of the actuator 95 of the first clutching assembly 200, and the pressure chamber 44 of the second clutching assembly 201 to be supplied with line pressure, while the pressure chambers 72, 73, 77, and 82 are not supplied with any substantial pressures. Thus rotational power is transmitted from the crankshaft of the internal combustion engine via the flywheel 23 and via the second clutch assembly 201 to the second driving gear wheel shaft 4, whence it is transmitted through the fourth speed speed driving gear wheel 9 to the second speed driven gear wheel 14 constantly meshed therewith, whence said drive is transmitted to the driven gear wheel shaft 10 to which said fourth speed driven gear wheel 14 is currently engaged, whence it is output via the power output gear wheel 15 to the differential gear mechanism 85. However, when it is desired to shift down to the third speed stage, first as a preparatory step, by supply of an ON electrical signal by the electrical control device 140 to the electromagnetic fluid switching valve 115, which causes the pressure chamber 73 of the first hydraulic actuator 68 to the supplied with line pressure, the first-third synchronizer sleeve 16f of the first-third synchronizer 16 is shifted to its leftwards position, so as to rotationally engage the third speed driven gear wheel 13 with the driven gear wheel shaft 10, but at this time no drive will be transferred by this rotational engagement because the first clutch assembly 200 is disengaged. Then, in order to actually engage the third speed stage, i.e. to perform the downshift, the first clutch assembly 200 is engaged and the second clutch assembly 201 is disengaged, again with a good mutual timing being maintained during this switching over of engagement conditions, by supply of an OFF electrical signal by the electrical control device 140 to the electromagnetic fluid switching valve 111, which causes the pressure chamber 96 of the actuator 95 of the first clutching assembly 200 to be supplied with substantially zero pressure, and by supply of an OFF electrical signal by the electrical control device 140 to the electromagnetic fluid switching valve 112, which causes the pressure chamber 44 of the second clutching assembly 201 to be also supplied with substantially zero pressure. Later, at a convenient time, the second-fourth synchronizer sleeve 17f of the second-fourth synchronizer 17 is brought back to its neutral or intermediate position, and thereafter the engagement condition of the second clutch assembly 201 becomes irrelevant.

Finally, during vehicle operation in the reverse speed stage, the first-third synchronizer sleeve 16f of the first-third synchronizer 16 and of the second-fourth synchronizer sleeve 17f of the second-fourth synchronizer 17 are both positioned to their central or intermediate positions, and the reverse idler gear wheel 20 is shifted to the left in FIGS. 1 and 2 along the axial direction of the reverse idler gear wheel shaft 19, so as to mesh with the reverse speed driving gear wheel 7 and with the reverse speed driven gear wheel 18 formed on the outside of the first-third synchronizer sleeve 16f, and the first clutch assembly 200 is engaged while the second clutch assembly 201 is disengaged, by supply of an ON electrical signal by the electrical control device 140 to the electromagnetic fluid switching valve 117, and by supply of OFF electrical signals by the electrical control device 140 to the electromagnetic fluid switching valves 111, 112, 113, 114, 115, and 116, which causes the pressure chamber 82 of the hydraulic actuator 82 for the reverse speed stage to be supplied with line pressure, while the pressure chambers 72, 73 77, 78, 96, and 44 are not supplied with any substantial pressures. Thus at this time rotational power is transmitted from the crankshaft of the internal combustion engine via the flywheel 23 and via the first clutch assembly 200 to the first driving gear wheel shaft 3, whence it is transmitted through the reverse speed driving gear wheel 7 and the reverse idler gear wheel 20 and the reverse speed driven gear wheel 18 to the driven gear wheel shaft 10, whence it is output via the power output gear wheel 15 to the differential gear mechanism 85, now in a reverse rotational sense to the previous forward driving one, since one more gear wheel, the reverse idler gear wheel 20, is present in the rotational force transmission path. And at this time smooth starting off and stopping of the vehicle in the reverse speed stage can be accomplished by selectively either supplying an OFF or an ON electrical signal from the control device 140 to the electromagnetic switching valve 111, so as respectively either to engage or disengage the first clutching assembly 200.

Next, the operation of the shown transmission system will be explained, in the case that the AUTOMATIC/-MANUAL mode selection switch 145 is set to the MANUAL setting, so that the transmission system functions in the purely manual mode.

In this case, the electrical control device 140 steadily outputs OFF electrical signals to the electromagnetic fluid switching valves 132 and 133 (except in order to refresh the pressure in the pressure chamber 44 as will be explained later), so as to keep their ports "b" communicated to their ports "c", and thus the electromagnetic fluid switching valve 111 and the electromagnetic fluid switching valve 112 are disconnected from the transmission and their operation is irrelevant thereto, while the clutch master cylinder device 150 is connected so as to operate the first and second clutching assemblies 200 and 201, with its pressure chamber 152 communicated via the hydraulic fluid conduits 136 and 134 straight to the pressure chamber 96 of the actuator 95 for the first clutching assembly 200, and with its suction chamber 153 communicated via the hydraulic fluid conduits 137 and 135 straight to the pressure chamber 44 of the first clutching assembly 201.

In this operational mode, in more detail, when the pad of the clutch pedal 155 is depressed by the foot of a vehicle operator (i.e. is moved leftwards in FIG. 3) the piston 151 is moved leftwards so as to compress the hydraulic fluid in the pressure chamber 152 and so as to provide pressure to the pressure chamber 96 of the actuator 95 for the first clutching assembly 200, so as to disconnect said first clutching assembly 200, and so as simultaneously to depressurize the hydraulic fluid in the suction chamber 153 and so as to suck hydraulic fluid from the pressure chamber 44 of the second clutching assembly 201, so as also to disconnect said second clutching assembly 201; while, on the other hand, when the clutch pedal 155 is released by the foot of said vehicle operator, the clutch pedal 155 and the piston 151 are moved rightwards (under the compression action of the return spring 154) so as to to depressurize the hydraulic fluid in the pressure chamber 152 and so as to suck hydraulic fluid from the pressure chamber 96 of the actuator 95 for the first clutching assembly 200, so as to connect said first clutching assembly 200, and so as simultaneously to compress the hydraulic fluid in the suction chamber 153 and so as to compress the hydraulic fluid in the pressure chamber 44 of the second clutching assembly 201, so as also to connect said second clutching assembly 201. Thus, the first and second clutching assemblies 200 and 201 are operated together to be engaged and disengaged together by the clutch pedal 155, exactly as in a conventional manual transmission.

At this time, since as will be understood from what follows the first and second clutching assemblies 200 and 201 will typically be required to both be connected for a long time, a problem might arise of the pressure in the pressure chamber 44 of the second clutching assembly 201 leaking out and thus ceasing to engage said second clutching assembly 201. Therefore, in this operational mode of continuously engaging the two clutching assemblies 200 and 201, the electrical control device 140 monitors the pressures in the conduits 134 and 135 by pressure sensors 146 and 147 respectively, and when it detects that the pressure in the chamber 44 is dropping below a predetermined pressure which is sufficient for engaging the second clutching device 201 while the pressure in the chamber 96 is substantially atmospheric so that it is clear that both the clutching assemblies 200 and 201 ought to be engaged, then the electrical control device 140 outputs proper electrical control signals to the two electromagnetic switching valves 112 and 133 for supplying a certain amount of pressurized hydraulic fluid from the pump 100 to the pressure chamber 44 via the conduits 103, 105, 119, and 135, so as to raise the pressure in said pressure chamber 44. Thereby, this problem of leaking out of pressure in the pressure chamber 44 is avoided.

It will be easily understood that accordingly, when these first and second clutching assemblies 200 and 201 are thus together engaged, the first and second driving gear wheel shafts 3 and 4 rotate together at all times, with the first, second, third, and fourth speed driving gear wheels 5, 8, 6, and 9 all turning together. In this operational mode, therefore, the transmission mechanism shown in FIG. 1 can be operated as a conventional type manual transmission, with the only difference being that the synchronizers 16 and 17 and the reverse idler gear wheel 20 are not directly manually actuated, but instead are hydraulically actuated via the first and second hydraulic actuators 68 and 69 and the reverse speed stage hydraulic actuator 81. In more detail, for operation of the transmission in the first speed stage, the operator positions the control knob 149 on the transmission control board 148 to the "L" position which in this operational mode means "first speed stage", and then the electrical control device 140 outputs an ON electrical signal to the electromagnetic switching valve 113, and outputs OFF electrical signals to the electromagnetic switching valves 114, 115, 116, and 117, so as to provide line pressure to the pressure chamber 72 of the first hydraulic actuator 68 but not to the pressure chambers 73, 77, 78, and 82 of the first and second hydraulic actuators 68 and 69 and the reverse speed stage hydraulic actuator 81, and so as thus to engage the first speed stage of the transmission as explained above. For operation of the transmission in the second speed stage, the operator positions the control knob 149 on the transmission control board 148 to the "2" position which in this operational mode means "second speed stage", and then the electrical control device 140 outputs an ON electrical signal to the electromagnetic switching valve 114, and outputs OFF electrical signals to the electromagnetic switching valves 113, 115, 116, and 117, so as to provide line pressure to the pressure chamber 77 of the second hydraulic actuator 69 but not to the pressure chambers 73, 72, 78, and 82 of the first and second hydraulic actuators 68 and 69 and the reverse speed stage hydraulic actuator 81, and so as thus to engage the second speed stage of the transmission as explained above. For operation of the transmission in the third speed stage, the operator positions the control knob 149 on the transmission control board 148 to the "3" position which in this operational mode means "third speed stage", and then the electrical control device 140 outputs an ON electrical signal to the electromagnetic switching valve 115, and outputs OFF electrical signals to the electromagnetic switching valves 114, 114, 116, and 117, so as to provide line pressure to the pressure chamber 73 of the first hydraulic actuator 68 but not to the pressure chambers 72, 77, 78, and 82 of the first and second hydraulic actuators 68 and 69 and the reverse speed stage hydraulic actuator 81, and so as thus to engage the third speed stage of the transmission as explained above. For operation of the transmission in the fourth speed stage, the operator positions the control knob 149 on the transmission control board 148 to the "D" position which in this operational mode means "fourth speed stage", and then the electrical control device 140 outputs an ON electrical signal to the electromagnetic switching valve 116, and outputs OFF electrical signals to the electromagnetic switching valves 113, 114, 115, and 117, so as to provide line pressure to the pressure chamber 78 of the second hydraulic actuator 69 but not to the pressure chambers 73, 72, 77, and 82 of the first and second hydraulic actuators 68 and 69 and the reverse speed stage hydraulic actuator 81, and so as thus to engage the fourth speed stage of the transmission as explained above. And for operation of the transmission in the reverse speed stage, the operator positions the control knob 149 on the transmission control board 148 to the "R" position which in this operational mode means "reverse speed stage", and then the electrical control device 140 outputs an ON electrical signal to the electromagnetic switching valve 117, and outputs OFF electrical signals to the electromagnetic switching valves 113, 114, 115, and 116, so as to provide line pressure to the pressure chamber 82 of the reverse speed stage hydraulic actuator 81 but not to the pressure chambers 72, 73, 77, and 78 of the first and second hydraulic actuators 68 and 69, and so as thus to engage the reverse speed stage of the transmission as explained above.

And when shifting between these speed stages the clutch pedal 155 is used just as in a conventional manual type transmission, being depressed by the driver of the vehicle before shifting between the speed stages, i.e. before moving the knob 149. Further, during shifting off of the vehicle from rest, again the clutch pedal 155 is used just as in a conventional manual type transmission, being depressed before engaging the speed stage, and being then progressively smoothly released while simultaneously carefully controlling the accelerator pedal of the vehicle.

According to the shown construction, therefore, a transmission system is provided which can be operated either as a manual type transmission system or as a fully automatic type transmission system. Thus the complementary advantages of both the manual type of transmission and also the full automatic type of transmission are combined, and their disadvantages may be avoided. In the shown transmission system, the switchover between the manual operational mode and the fully automatic operational mode is simply performed, by only actuating the switch 145. When the transmission system is being operated in its full automatic mode, the currently most appropriate one of the speed stages of the transmission mechanism is automatically selected and automatically engaged by the electrical control device 140 according to various operational parameters of the vehicle such as vehicle road speed and engine load and based upon upon predetermined transmission shifting patterns. Thus, in this full automatic operational mode, even when the transmission system is operated by a relatively unskilled vehicle operator over a long period of driving time, control does not become tiring, even in city traffic conditions. Accordingly, the vehicle incorporating this transmission system is in this operational mode very easy to use, and during driving the operator of the vehicle is not distracted from paying attention to road conditions by the requirements of transmission operation. Further, the vehicle can be operated by a driver who is not skilled at simultaneously operating the clutch and transmission and accelerator pedal. On the other hand, when the transmission system is being operated in its manual mode, the vehicle may be moved away from rest by the coordinated of the clutch pedal and the accelerator pedal and the gear selection knob 149. Further, the clutch pedal can be used to shift between the speed stages by the operator, along with manual operation of the gear selection knob. Thus, in this operational mode, the operator can shift between the various speed stages of the transmission, during vehicle motion, according entirely to his or her own personal wish and desire and judgement based upon skill in vehicle operation. This makes the transmission and the vehicle as a whole convenient and pleasant to use for a skilled driver, and provides the maximum possible flexibility in transmission operation and control, by not substantially limiting the control of the vehicle operator over which transmission stage is engaged, so that any speed stage which is actually desired to be engaged may be currently engaged.

Although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of this preferred embodiment, without departing from the scope of the present invention. Therefore it is desired that the scope of the present invention, and of the protection sought to be granted by Letters Patent, should be defined not by any of the perhaps purely fortuitous details of the shown preferred embodiment, or of the drawings, but solely by the scope of the appended claims, which follow.

What is claimed is:

1. A transmission for an automotive vehicle comprising an engine, comprising:
   a gear transmission mechanism which selectively provides a plurality of forward speed stages of successively different reduction gear ratios according to a control signal supplied thereto;
   a clutching mechanism including a clutch pedal and a power actuator for selectively power transmittingly connecting or disconnecting said gear transmission mechanism to or from said engine for the convenience of changing over of said speed stages in said gear transmission mechanism, according to operation of said pedal by a vehicle driver or a control signal supplied thereto;

an operational mode selection means for operation by the vehicle driver to set operational mode of the transmission either to automatic or manual operational mode;

a speed/range selection means for operation by the vehicle driver to select ranges of speed stages which are available according to automatic speed change control by said gear transmission mechanism when said operational mode selection means is set to the automatic operational mode and to select any one of said plurality of forward speed stages for said gear transmission mechanism when said operational mode selection means is set to the manual operational mode, said speed/range selection means having the same number of shift positions for forward speed operation of the vehicle as the number of the forward speed stages, wherein, when said operational mode selection means is set to the automatic operational mode, each of said shift positions for forward speed operation provides a range of speed stages that includes a speed stage corresponding to the shift position and all lower forward speed stages, and wherein, when said operational mode selection means is set to the manual operational mode, each of said shift positions provides the speed stage which is the highest in the range of speed stages corresponding to that shift position; and a control means which generates said control signals to be supplied to said gear transmission mechanism and said clutching mechanism according to operational conditions of the vehicle and the engine and the range of speed stages selected by said speed/range selection means when said operational mode selection means is set to select the automatic operational mode and according to the speed stage selected by said speed/range selection means when said operational mode selection means is set to select the manual operational mode.

2. A transmission according to claim 1, wherein said speed/range selection means has four shift positions for forward speed operation of the vehicle named as L, 2, 3 and D positions for the transmission to provide a first range of speed stages in which first speed stage only is available, a second range of speed stages in which first and second speed stages are available, a third range of speed stages in which first, second and third speed stages are available, and a fourth range of speed stages in which first, second, third and fourth speed speed stages are available, respectively, in automatic operation of the transmission, while in manual operation of the transmission the transmission provides first, second, third, and fourth speed stages when said speed/range selection means is shifted to said L, 2, 3, and D positions, respectively.

* * * * *